United States Patent [19]

Vitous

[11] 3,958,502
[45] May 25, 1976

[54] BEVERAGE BREWER

[75] Inventor: Charles J. Vitous, Berwyn, Ill.

[73] Assignee: Cory Food Services, Inc., Chicago, Ill.

[22] Filed: May 16, 1975

[21] Appl. No.: 578,204

[52] U.S. Cl. ................................. 99/300; 99/304; 222/193
[51] Int. Cl.² ......................................... A47J 31/00
[58] Field of Search ............ 99/300, 293, 294, 301, 99/304, 315–316; 219/39, 312; 222/76, 108, 146, 193–194, 312, 318; 239/498

[56] References Cited
UNITED STATES PATENTS

| | | | |
|---|---|---|---|
| 1,581,758 | 4/1926 | Morris | 99/300 X |
| 2,088,966 | 8/1937 | Lyons | 99/315 X |
| 2,869,760 | 1/1959 | Karlen et al. | 222/76 |
| 3,336,856 | 8/1967 | Martin | 99/300 X |
| 3,490,356 | 1/1970 | Peterson et al. | 99/300 |
| 3,626,839 | 12/1971 | Martin et al. | 99/315 |
| 3,771,432 | 11/1973 | Karlen | 99/304 |
| 3,793,934 | 2/1974 | Martin | 99/304 X |
| 3,836,050 | 9/1974 | Dreibelbis | 222/193 X |

*Primary Examiner*—Peter Feldman
*Assistant Examiner*—Arthur O. Henderson
*Attorney, Agent, or Firm*—Wegner, Stellman, McCord, Wiles & Wood

[57] ABSTRACT

A beverage brewer wherein hot liquid is delivered from a heating tank to a brewing cartridge as a result of introduction of additional liquid into the heating tank from a suitable source. An aspirator is provided in combination with a spray device for preventing dripping of hot liquid from the apparatus as a result of the expansion of the newly introduced liquid resulting from the heating thereof in the heating tank. The aspirator is removably associated with a reservoir structure and the reservoir structure is removably carried on the removable cover of the heating tank. A transfer duct between the reservoir structure and spray device is removably connected to the aspirator and is displaceable from a position overlying the heating tank to laterally thereof for facilitated removal of portions of the apparatus upwardly from the tank.

23 Claims, 5 Drawing Figures

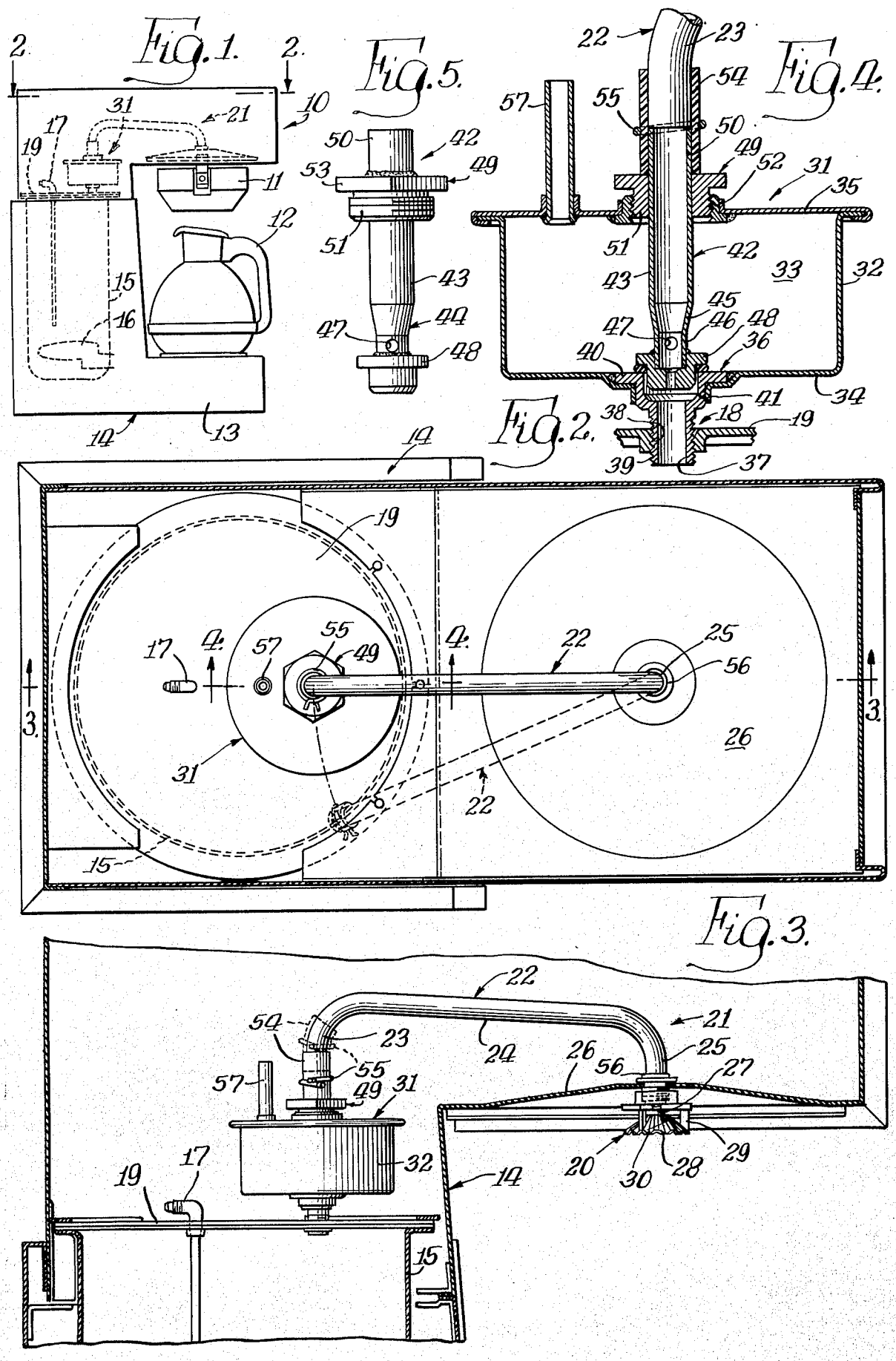

BEVERAGE BREWER

BACKGROUND OF THE INVENTION

1. Field of the Invention

This invention relates to beverage brewers and in particular to beverage brewers having a hot water holding tank with means for preventing post-brewing drip therein.

2. Description of the Prior Art

In Harvey R. Karlen et al U.S. Pat. No. 2,869,760, owned by the assignee hereof, a hot water dispenser is shown in one form to include an aspirator providing an expansion space in a reservoir housing as a function of the liquid flow through the apparatus from a source of liquid to an outlet. The aspirator utilizes a venturi means which communicates with the reservoir expansion space so as to permit liquid to expand from the main tank into the evacuated reservoir space when the liquid is heated in the tank. Thus, as disclosed in said Karlen et al patent, the device is intended to prevent dripping of heated liquid from the tank outlet which would otherwise occur as a result of such expansion as in the absence of such an expansion space means, the liquid level, upon termination of the liquid delivery, would be at the level of the outlet so that subsequent expansion would cause a dripping of the expanding liquid outwardly from the outlet.

The use of aspirator control in connection with the automatic provision of an auxiliary collection space in a reservoir chamber is disclosed in William Kelly U.S. Pat. No. 1,216,815, wherein an aspirator is associated with a drain receptacle to permit water in the outlet pipe above the ground level to fall back into the drain receptacle upon termination of delivery of water through the pipe system in which the venturi-type aspirator is provided.

In U.S. Pat. No. 2,691,465 of Gardner Royce, a non-drip nozzle is provided in association with a liquid tank for accommodating the rise of liquid level due to thermal expansion of liquid in the tank so as to prevent escape of fluid through the nozzle as a result of such expansion. In the Royce nozzle, a venturi aspirator is provided as an integral portion of a reservoir chamber means. The delivery duct comprises an integral extension of the venturi aspirator and the entire nozzle is secured to an outlet pipe extending from the top cylinder head.

More recently, such aspirators have been used in hot water heaters such as for providing hot water from a pressure source, such as a domestic water supply system. Illustratively, in U.S. Pat. No. 2,903,551 of Harry C. Fischer, an aspirator is provided utilizing a tube having a closed bottom with a discharge pipe provided with a port opening into the tube.

U.S. Pat. No. 3,202,321 of Arthur B. Homeyer utilizes an aspirator-type dispenser in combination with a cap for controlling flow of the hot water through the device. In U.S. Pat. No. 3,642,176 of Richard C. Dreibelbis et al, a similar aspirator-type dispenser is provided with a hot water storage tank and a lever operating the control valve.

SUMMARY OF THE INVENTION

The present invention comprehends an improved apparatus for providing heated liquid wherein the heated liquid may be provided in the form of a spray. A problem arises in the provision of such aspirator-expansion space hot water supply systems where the outlet is restricted in that the aspirator device may not fully aspirate the expansion space chamber as a result of the back-pressure caused by the flow restricting outlet means. The present invention comprehends the use of an aspirator-type expansion chamber means with an improved spray device which has been found to provide suitable aspirating action in the operation of the device to provide the desired expansion space in the reservoir chamber means while providing a distributed sprayed delivery of the liquid to a brewing cartridge or the like. Thus, the present invention is advantageously adapted for use in a coffee brewer wherein the brewing water is maintained hot in a holding tank and caused to be delivered therefrom by the introduction of cold water to the lower portion of the tank.

The aspirator means of the present invention comprises a further improvement over the hot water dispenser aspirator means of the Karlen et al patent referred to above owned by the assignee hereof in providing for facilitated maintenance of the aspirator means. Thus, while the aspirator means is mounted to an upper portion of the holding tank, as in the above described Royce patent, the aspirating means of the present invention provides improved facilitated maintenance and servicing in being removably assembled so as to permit facilitated removal of the aspirator means from the reservoir chamber means, as well as facilitated removal of the reservoir chamber means from the tank means.

Additionally, the present invention comprehends an improved arrangement of the outlet duct to permit facilitated removal of the aspirator means, the reservoir means, and/or the tank cover in the servicing of the apparatus. In such apparatus, liming thereof is a serious problem. More specifically, where water is maintained at a high temperature for long periods of time, deposits of minerals from the water may accumulate on the surfaces of the apparatus so as to require periodic removal to maintain efficiency of operation of the apparatus. The facilitated separability of the elements of the present invention provides simplified and facilitated maintenance and, thus, provides a substantially improved functioning over the aspirator devices of the prior art.

The present invention further comprehends the use of such an aspirator-type drip-preventing means in combination with means for distributing the hot water from the outlet such as onto coffee grounds in a conventional brewing cartridge. In the conventional prior art spray heads, the substantial flow restriction characteristics thereof have effectively prevented use of such aspirator systems in such brewing apparatuses. The present invention comprehends providing a spray means which effectively permits free delivery of the hot water liquid through the aspirator means so as to assure desired aspirating action and positive prevention of drip in the operation of the apparatus. The spray means herein comprise a deflector baffle device which effects a distributed delivery of the hot water from the stream thereof delivered through the outlet duct and, thus, is advantageously adapted for use in connection with the brewing of beverages, such as coffee, while concurrently being advantageously adapted for use in combination with the above-discussed aspirator-type drip preventing means.

The drip preventing means and brewing apparatus of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a heated liquid-providing apparatus embodying the invention;

FIG. 2 is an enlarged horizontal section thereof taken substantially along the line 2—2 of FIG. 1;

FIG. 3 is a fragmentary vertical section taken substantially along the line 3—3 of FIG. 2;

FIG. 4 is a fragmentary vertical section taken substantially along the line 4—4 of FIG. 2; and FIG. 5 is a side elevation of the aspirator.

DESCRIPTION OF THE PREFERRED EMBODIMENT

In the exemplary embodiment of the invention as disclosed in the drawing, an apparatus generally designated 10 is provided for delivering a spray of heated water into a brewing cartridge 11, such as for brewing coffee therein. The cartridge is arranged to deliver the brewed coffee into a subjacent decanter 12 carried on a base portion 13 of a housing generally designated 14 of the apparatus. The hot water supply is of the open-to-atmosphere type wherein water is heated in a tank 15 by a conventional electric heating coil 16, cold water being delivered to the tank through an inlet 17 and the hot water being delivered from the tank through an outlet generally designatd 18, both at the top of the tank.

In the illustrated embodiment, the tank is provided with a removable cover 19 in which the inlet 17 and outlet 18 are disposed. The invention comprehends the provision of improved means generally designated 21 for conducting the hot water from the outlet 18 to a spray device generally designated 20 adapted to provide a distributed delivery of the hot water into the brewing cartridge 11 for improved brewing of the coffee beverage therein.

More specifically, the hot water conducting means 21 includes a delivery duct 22 defining an inlet portion 23, a transfer portion 24, and an outlet portion 25. As shown in FIG. 3, the transfer duct is generally U-shaped with the inlet and outlet portions extending downwardly from opposite ends of the transfer portion. The outlet portion 25 is removably secured to a horizontal wall portion 26 of the housing 14 and defines an outlet opening 27 superjacent a deflector baffle 28 carried on the duct outlet portion 25 by a suitable connecting portion 29. For purposes brought out more fully hereinafter, the outlet opening 27 is preferably relatively large so as to provide minimum resistance to liquid flow while providing the liquid in the form of a stream against the center of the baffle 28. The baffle includes a plurality of downwardly divergent channels 30 adapted to conduct the deflected liquid downwardly onto the subjacent cartridge 11 in the form of a plurality of radiating streams for improved brewing of the coffee beverage.

In such open-to-atmosphere hot water heaters, a problem arises in that the delivery of hot water is caused by the displacement thereof by the incoming cold water with the termination of the hot water delivery being effected by the termination of the cold water delivery. Upon termination of the hot water delivery, a substantial portion of the water in the tank may be relatively cold so that upon subsequent heating thereof, a substantial expansion occurs whereby water may tend to drip outwardly through the outlet conducting means. The present invention is concerned with preventing such dripping and utilizes a reservoir means 31 for accommodating the expansion of the water below the level of the outlet. Improved means are provided for automatically evacuating the reservoir chamber during each delivery operation of the apparatus to provide the desired drip prevention operation.

More specifically, as shown in FIG. 4, the reservoir means comprises a tank 32 defining a reservoir chamber 33. The tank includes a bottom wall 34 and may be provided with a removable cover 35.

An inlet connector 36 is sealingly mounted to the bottom wall 34 and includes a tubular portion 37 adapted to be removably connected to the tank cover 19. As shown in FIG. 4, the tank cover may be provided with a threaded outlet opening 38 and the connector portion 37 may be provided with a complementary male thread 39 to provide the desired sealed removable connection.

Connector 36 further defines an annular seat 40 extending through an inlet opening 41 in the reservoir tank wall 34. An aspirator generally designated 42 is defined by a tubular duct portion 43 having a venturi portion 44 defined by a tapered duct portion 45 and a cylindrical duct portion 46 provided with one or more openings 47 communicating between the interior of the duct and the chamber 33. The lower end of aspirator portion 46 may be provided with a sealing connector portion 48 adapted to have sealed seating association with the connector seat 40, as shown in FIG. 4, when the aspirator is installed in the reservoir means 31.

Duct portion 43 is provided with a connector 49 adjacent its upper end 50 which may include a threaded portion 51 adapted to be removably threaded to a female threaded connector 52 extending through tank cover 35 in coaxial alignment with inlet connector 36. The connector 49 includes a flatted portion 53 for facilitated engagement by a suitable wrench or the like for installing and removing the aspirator 42 relative to reservoir means 31, as desired.

Inlet portion 23 of delivery duct 22 is sealingly connected to the aspirator duct end 50 as by a tubular sleeve 54 which may be constricted thereabout by a suitable wire clamp 55, as shown in FIG. 4. The invention comprehends the swingable mounting of the delivery duct 22 on a connector 56 connecting the outlet portion 25 of the delivery duct to the housing wall 26, as shown in FIGS. 2 and 3. Thus, upon movement of the connecting sleeve 54 upwardly onto duct end 23, the delivery duct may be swung from the full line position shown in FIG. 2 to the dotted line position shown therein, or beyond, to permit facilitated selective removal of the reservoir means 31 and/or the tank cover 19 of the main heating tank to permit facilitated service of these apparatus components. Further, upon disconnection of the delivery duct 22 from the aspirator duct portion 50, the aspirator may be readily removed from the reservoir means 31 without requiring the removal of the tank 32.

As shown in FIG. 3, heating tank 15 may be disposed below the level of the spray device 20 whereby the reservoir means 31 may similarly be disposed below the level of the delivery duct outlet opening 27. Cover 35 of reservoir tank 32 may be provided with an upstanding vent tube 57 for venting the reservoir chamber 33 to a point above the level of the outlet opening 27. Thus, the connector portion 37 may be preselected to provide the desired relationship between the level of the reservoir means 31 and the spray device 20, as illustrated in FIGS. 1 and 3.

As indicated briefly above, the invention permits the use of the improved aspirator means 42 in combination with a spray device for brewing beverage, such as coffee, in cartridge 11. Spray device 20 provides an effectively minimum back-pressure to permit effectively optimum operation of the aspirator 42 in providing a desired expansion space for the water expanded from tank 15 upwardly to the reservoir means 31 as a result of the heating of the cold water delivered thereto in a preceding hot water delivery operation. More specifically, during a hot water delivery operation, hot water is forced upwardly through the aspirator duct and the delivery duct 22 to impinge on baffle 30 for effective spray delivery of the hot water into cartridge 11. The flow of the hot water through the aspirator portions 45 and 46 causes a suction to be developed therein whereby water in reservoir chamber 33 is sucked into the flowing hot water and delivered therewith into the brewing cartridge until the level of water in reservoir chamber 33 is lowered to the level of the opening 47 adjacent bottom wall 34.

Upon termination of the hot water delivery by termination of the cold water delivery into tank 15 through inlet 17, water in delivery tube 22 may drain substantially immediately through outlet opening 27. As reservoir chamber 33 is effectively evacuated, it now defines an expansion space for receiving the expanding hot water from tank 15 as the water is heated therein. Thus, as the hot water rises from tank 15 into the lower portion 46 of the aspirator tube, the water may flow outwardly therefrom through opening 47 into reservoir chamber 33 which is preselected to accommodate all of the expansion volume without overflow. Thus, drip of the hot water through outlet opening 27 as a result of the expansion of the water in tank 15 is effectively prevented.

As indicated briefly above, the present invention comprehends an improvement over the earlier drip preventing devices of the prior art such as shown in Royce U.S. Pat. No. 2,691,465. Thus, the present invention comprehends an arrangement of the aspirator and reservoir means permitting facilitated removal and installation in the apparatus as well as facilitated disassembly of the elements thereof for facilitated maintenance such as periodic deliming of the elements. Thus, the aspirator 42 may be readily removed from the reservoir means 31 by the disconnection of the delivery tube 22 from the aspirator tube portion 50 and the swinging of the delivery tube out of the way to permit an upward withdrawal of the aspirator by a simple unthreading of the connector 49 from the reservoir chamber cover 35. Thus, the aspirator tube may be readily delimed from time to time as required by the nature of the water being heated.

Similarly, when desired, the reservoir means 31 may be disconnected from the tank cover 19 by the threaded removal of the connector portion 39 from the tank cover threaded means 38. Such removal is readily permitted by the swinging of the delivery tube 22 to the dotted line position of FIG. 2 after disconnection thereof from the aspirator duct portion 50.

To facilitate deliming of the tank 15, the delivery tube may be swung beyond the dotted line position of FIG. 2 after disconnection thereof from duct portion 50, whereupon the entire cover 19 may be removed upwardly from the tank to provide access thereto without requiring removal of the tank from housing 14.

The foregoing disclosure of specific embodiments is illustrative of the broad inventive concepts comprehended by the invention.

I claim:

1. Apparatus for providing a spray of heated liquid comprising:
    a tank;
    means for delivering liquid into said tank;
    means for heating liquid in said tank;
    duct means for conducting heated liquid from said tank to an outlet as an incident of delivery of liquid into said tank by said liquid delivering means;
    means defining a vented reservoir superjacent the tank;
    aspirator means responsive to the flow of said heated liquid for withdrawing liquid from said reservoir to provide an expansion space in said reservoir for receiving liquid subsequently expanded from said tank thereinto as a result of heating of the liquid delivered to said tank by said delivery means; and
    baffle means spaced adjacent said duct outlet for impingement of the conducted heated liquid thereagainst to cause delivery of the heated liquid therefrom in the form of a spray.

2. The liquid spray apparatus of claim 1 wherein said reservoir means is spaced above said tank.

3. The liquid spray apparatus of claim 1 wherein said reservoir means is spaced above said tank and connected thereto by a portion of said duct means.

4. The liquid spray apparatus of claim 1 wherein said duct means extends through said reservoir.

5. The liquid spray apparatus of claim 1 wherein said duct means includes a portion removably mounted to said reservoir means and extending through said reservoir.

6. The liquid spray apparatus of claim 1 wherein said reservoir means is removably mounted to said tank.

7. The liquid spray apparatus of claim 1 wherein said aspirator means is provided in a portion of said duct means.

8. The liquid spray apparatus of claim 1 wherein said aspirator means is disposed in a lower portion of said reservoir.

9. The liquid spray apparatus of claim 1 wherein the level of said duct outlet is above the level of the top of said tank.

10. The liquid spray apparatus of claim 1 wherein said duct outlet opens downwardly and said baffle means is spaced below said outlet.

11. The liquid spray apparatus of claim 1 wherein said apparatus further includes a beverage brewing receptacle positioned under said baffle means for receiving the sprayed heated liquid.

12. An aspirator comprising:
    wall means defining a reservoir having an inlet and an outlet;
    duct means removably mountd to said wall means defining a liquid flow passage from said inlet to said outlet;
    venturi means associated with said duct means for aspirating said reservoir as the result of a flow of liquid through said duct means, said duct means and venturi means being removable from said reservoir through said wall means.

13. The aspirator of claim 12 wherein said duct means is removably secured to said wall means at said outlet.

14. The aspirator of claim 12 wherein said duct means is removably secured to said wall means at said outlet and is provided with sealing means for removably sealingly connecting the duct to said inlet.

15. The aspirator of claim 12 wherein said venturi means is formed integrally with said duct means.

16. The aspirator of claim 12 wherein said venturi means is formed integrally with said duct means adjacent said sealing means.

17. The aspirator of claim 12 wherein said inlet includes a duct portion extending outwardly away from said reservoir inlet for removably mounting said reservoir to a liquid supply tank.

18. The aspirator of claim 12 wherein said inlet defines an annular seat and said duct means includes an inner end having an annular seal separably sealingly engaging said seat, said duct means further including means for removably mounting the duct means to said wall means at said outlet permitting withdrawal of the duct means and venturi means through said outlet.

19. Apparatus for providing heated liquid comprising:
a tank having a removable cover;
means for heating liquid in the tank;
reservoir means mounted to said cover;
an aspirator in said reservoir means;
a delivery tube having a connecting portion connected to said aspirator, a transfer portion extending in overlying relationship to said cover, and a distal portion; and
means for supporting said distal portion of the delivery tube to permit swinging of said transfer portion and connecting portion laterally from over said tank to permit removal of said cover from the tank with said reservoir means mounted thereto.

20. The liquid providing apparatus of claim 19 wherein said aspirator is removably carried by said reservoir means.

21. The liquid providing apparatus of claim 19 wherein said reservoir means is removably mounted to said cover.

22. The liquid providing apparatus of claim 19 wherein said aspirator is threadedly mounted to said reservoir means and said delivery tube is sealingly, removably connected to said aspirator.

23. The liquid providing apparatus of claim 19 wherein said reservoir means is threadedly connected to said tank cover.

* * * * *